G. L. A. FRIEDRICHS.
APPARATUS FOR PRESERVING PERISHABLE PRODUCTS.
APPLICATION FILED JAN. 8, 1921.
1,405,775. Patented Feb. 7, 1922.
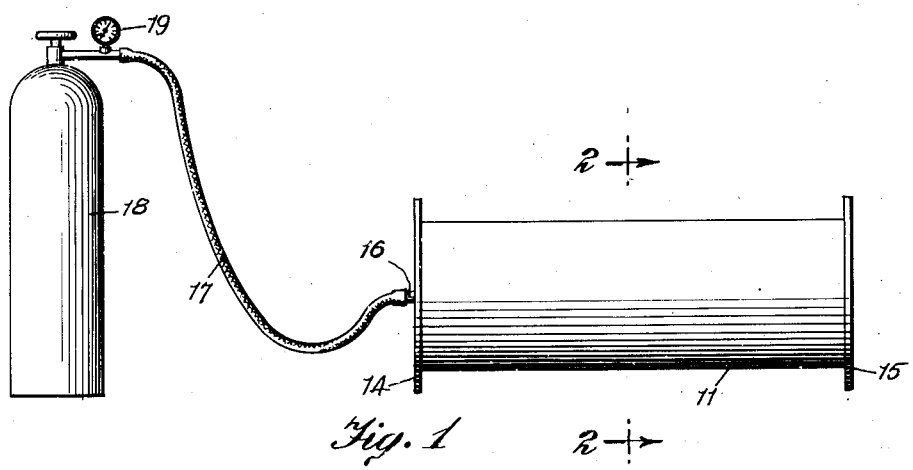
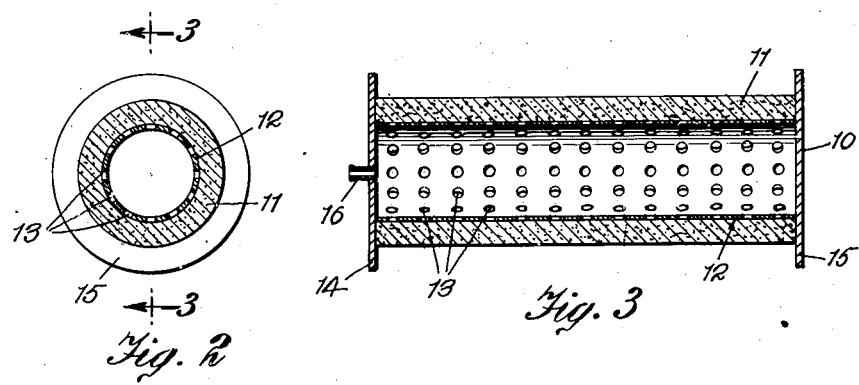
Inventor
Gottfried L. A. Friedrichs
By his Attorney

UNITED STATES PATENT OFFICE.

GOTTFRIED L. A. FRIEDRICHS, OF NEW YORK, N. Y.

APPARATUS FOR PRESERVING PERISHABLE PRODUCTS.

1,405,775.   Specification of Letters Patent.   Patented Feb. 7, 1922.

Application filed January 8, 1921. Serial No. 435,875.

*To all whom it may concern:*

Be it known that I, GOTTFRIED L. A. FRIEDRICHS, a citizen of Germany, and a resident of New York, in the county of New York and State of New York, have invented certain new and useful Improvements in an Apparatus for Preserving Perishable Products, of which the following is a full, clear, and exact specification.

This invention relates to a class of apparatus adapted to be used for preventing spoilage chiefly of food products while being kept for consumption.

My invention has for its object primarily to provide an apparatus designed to be employed for enabling fish and the like to be shipped alive to distant places after being caught as well as enabling meats, fruit, vegetables and other products of perishable character to be preserved in healthful condition while being held or transported by subjecting them to a purifying gas which is distributed in a manner so that the surrounding atmosphere will be effectually charged with the preservative. This is accomplished mainly by providing in conjunction with a regulated source of supply of preservative gas especially oxygen a receiving chamber and distributer of a type into which charges of the gaseous fluid is delivered and then discharged in molecular form for distribution over the area occupied by the products to be preserved whereby the atmosphere surrounding the products will be kept in a pure state by impregnation of the air with the gas.

A further object of the invention is to provide an apparatus for preserving perishable products of a simple and efficient construction which may be made in various sizes and shapes.

With these and other objects in view, the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is an elevation of one form of apparatus for preserving perishable products embodying my invention.

Fig. 2 is a cross section taken on the line 2—2 of Fig. 1.

Fig. 3 is a longitudinal section taken on the line 3—3 of Fig. 2, and

Fig. 4 is a section taken through the distributer or porous jacket used in the apparatus.

The apparatus has a receiving chamber 10 and a distributer 11 both of which may be of appropriate sizes and shapes as occasion requires. The chamber 10 may be in the form of a cylinder made of metal or other material, such as aluminum, of sufficient tensility to withstand being charged with a preservative gas, as oxygen, when delivered thereinto under pressure, and this chamber has an annular wall 12 in which is provided closely spaced apertures or perforations or outlets 13. The ends of the annular wall 12 are closed by plates, as 14 and 15, of larger dimensions than the wall so that their marginal edge parts extend considerable distances from the wall, in order to permit the chamber and distributer to be positioned upon in spaced relation to a suitable support. In the end wall 14 of the perforated chamber 10 may be an inlet 16 in the form of a nipple, the passage through which leads into the interior of the chamber, and to this nipple is held one end of a pipe 17 having its other end connected to the valve of a cylinder or tank, as 18, containing oxygen gas under pressure, the tank being provided with a gage, as 19, for regulating the volume of discharge of the gas from the tank, the tank and its parts being of any well known makes for supplying oxygen. The distributer 11 is in the form of a jacket or tubular body which fits closely upon the exterior of the chamber so that it overlaps the perforations or outlets 13 of the chamber, and this distributer may be of any efficient porous material not susceptible to being affected by oxygen gas, though I prefer to make the distributer or jacket of compressed grains or small particles of hard carbon such as the quality ordinarily used in the carbon points of electric lamps and in certain forms of electric brushes. A distributer of this character is fabricated so that a porosity is provided which serves to dissipate as well as retarding the free flow of oxygen gas delivered through the perforations 13 of the chamber 10 so that the gas will slowly pass therethrough in a fine molecular state for distribution in various directions.

In practice the apparatus is arranged so that the chamber and distributer are contiguous to the products to be preserved, in order to allow the surrounding atmosphere to be impregnated with the preservative gas. To keep fish and the like alive while being transported the water in which they are placed is constantly charged with given quantities of the gas the supply being accordingly regulated at the outlet of the tank. By oxygenating the surrounding atmosphere in a similar manner meat, fruit and other perishable products may be preserved when shipped from place to place or otherwise prevented from spoilage while being kept for consumption.

In the foregoing description I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

1. An apparatus for preserving perishable products, comprising a cylinder having perforations in its wall and having closed ends with an inlet in one end for receiving preservative gas from a regulated source of supply, and an annular body of carbonaceous material on the body overlaying its perforations, said carbonaceous material being of porous texture adapted to dissipate and retard the flow of gas from the perforations of the cylinder so that the gas will be distributed in molecular form in the area surrounding the products.

2. An apparatus for preserving perishable products, comprising means providing a supply of oxygen gas under pressure, a cylinder having perforations in its wall and having closed ends with an inlet in one end for receiving the gas, and an annular body of carobenaus material on the body overlaying its perforations, said carbonaceous material being of porous texture adapted to dissipate and retard the flow of gas from the perforations of the cylinder so that the gas will be distributed in molecular form in the area surrounding the products.

3. An apparatus for preserving perishable products, comprising means providing a supply of oxygen gas under pressure, and a chamber of porous carbonaceous material, having an inlet leading from said means to receive the gas for passage through the pores for distribution in molecular form in the area surrounding the products.

This specification signed and witnessed this 7th day of January A. D. 1921.

GOTTFRIED L. A. FRIEDRICHS.

Witnesses:
   J. Frank,
   J. Frederick Cryer.